United States Patent
Mann

(10) Patent No.: US 11,834,538 B2
(45) Date of Patent: Dec. 5, 2023

(54) ANIONIC GRAFT POLYMERIZATION ONTO AN EXISTING POLYMER CHAIN BY ORGANOMETALLIC BASE ACTIVATION

(71) Applicant: ExxonMobil Chemical Patents Inc., Baytown, TX (US)

(72) Inventor: Jason A. Mann, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 1022 days.

(21) Appl. No.: 16/692,864

(22) Filed: Nov. 22, 2019

(65) Prior Publication Data

US 2020/0190241 A1 Jun. 18, 2020

Related U.S. Application Data

(60) Provisional application No. 62/779,252, filed on Dec. 13, 2018.

(51) Int. Cl.
| | | |
|---|---|---|
| C08F 257/02 | (2006.01) | |
| C08F 255/10 | (2006.01) | |
| C08F 279/00 | (2006.01) | |
| C08L 71/02 | (2006.01) | |
| C08F 255/06 | (2006.01) | |

(52) U.S. Cl.
CPC .......... *C08F 257/02* (2013.01); *C08F 255/06* (2013.01); *C08F 255/10* (2013.01); *C08F 279/00* (2013.01); *C08L 71/02* (2013.01)

(58) Field of Classification Search
CPC ............................. C08F 255/10; C08F 279/00
See application file for complete search history.

(56) References Cited

U.S. PATENT DOCUMENTS

| | | | | |
|---|---|---|---|---|
| 3,703,566 | A | * | 11/1972 | Duck ..................... C08F 255/02 525/289 |
| 3,879,494 | A | * | 4/1975 | Milkovich ............. C08G 18/10 525/76 |
| 4,078,019 | A | | 3/1978 | Langer, Jr. |
| 5,159,023 | A | * | 10/1992 | Cecchin ................ C08F 255/02 525/314 |
| 5,162,445 | A | * | 11/1992 | Powers ................. C08F 210/14 525/340 |
| 5,264,494 | A | | 11/1993 | Ho et al. ........................ 525/237 |
| 5,670,581 | A | * | 9/1997 | Frechet .................... C08F 8/42 525/364 |
| 5,840,810 | A | | 11/1998 | Frechet et al. .............. 525/333.3 |
| 5,849,828 | A | | 12/1998 | Frechet et al. ................ 525/342 |
| 5,866,659 | A | * | 2/1999 | Chung .................. C08F 212/24 525/379 |
| 6,011,120 | A | | 1/2000 | Frechet et al. ................ 525/288 |
| 6,034,164 | A | | 3/2000 | Elspass et al. ................ 524/445 |
| 9,487,613 | B2 | | 11/2016 | Stojcevic et al. ..... C08F 279/02 |
| 2007/0049695 | A1 | | 3/2007 | Parent et al. .................. 525/242 |

FOREIGN PATENT DOCUMENTS

| | | |
|---|---|---|
| CN | 107312128 A | 11/2017 |
| WO | 96/23821 A1 | 8/1996 |

OTHER PUBLICATIONS

Edgecombe, B. D. et al. (1998) "The Role of Polymer Architecture in Strengthening Polymer-Polymer Interfaces: A Comparison of Graft, Block, and Random Copolymers Containing Hydrogen-Bonding Moieties," *Macromolecules*, v.31(4), pp. 1292-1304.

Janata, M. et al. (2001) "Selective Grafting in Block Copolymers. 2. Multimetalated (Co)polymers as Initiators for Grafting Process. Model Metalation Studies," *Macromolecules*, v.34(6), pp. 1593-1599.

Lochmann, L. et al. (1993) "Multisite Functionalized Dendritic Macromolecules Prepared via Metalation by Superbases and Reaction with Electophiles," *J. Am. Chem. Soc.*, v.115(15), pp. 7043-7044.

Lochmann, L. et al. (2014) "50 Years of Superbases Made From Organolithium Compounds and Heavier Alkali Metal Alkoxides," *Cent. Eur. J. Chem.*, v.12(5)., pp. 537-548.

Steinke, J. H. et al. (1996) "Metalation, a Novel route for the Functionalization of Reactive Elastomers. 1. Superbases in the Mtalation of Poly(isobutylene-cop-methylstyrene)," *Macromolecules*, v.29(19), pp. 6081-6089.

Chung, T.C., et al. (2002) "Synthesis of functional polyolefin copolymers with graft and block structures" Prog. Polym. Sci 27; pp. 39-85.

* cited by examiner

*Primary Examiner* — Christopher M Rodd

(57) ABSTRACT

Polyolefin elastomers are widely employed commodity polymers. There remains a desire to expand the structural diversity of polyolefin elastomers to facilitate their use in additional applications. Polyolefin elastomers may be graft copolymers that comprise: a first polymer chain comprising at least a first olefinic monomer comprising isobutylene and a second olefinic monomer bearing a benzylic carbon atom or an allylic carbon atom, and a second polymer chain bonded to the benzylic carbon atom or the allylic carbon atom of the first polymer chain. The second polymer chain comprises at least one monomer that is not present in the first polymer chain. The second polymer chain may be bonded to the first polymer chain by generating a carbanion upon the benzylic carbon atom or the allylic carbon atom and growing the second polymer chain by anionic polymerization.

9 Claims, No Drawings

ANIONIC GRAFT POLYMERIZATION ONTO AN EXISTING POLYMER CHAIN BY ORGANOMETALLIC BASE ACTIVATION

CROSS-REFERENCE TO RELATED APPLICATIONS

This application claims priority to and the benefit of U.S. Provisional Application No. 62/779,252, filed Dec. 13, 2018, the disclosure of which is incorporated herein by reference in their entireties.

FIELD

The present disclosure relates to polyolefins having a second polymer chain grafted onto a benzylic carbon atom or an allylic carbon atom located upon a polymer side chain and methods for production thereof.

BACKGROUND

Polyolefin elastomers are commodity polymeric materials that are increasingly being employed in applications where natural and synthetic rubber materials and other synthetic elastomers have been more traditionally used. Depending on the nature of the intended application and the particular polyolefin backbone, polyolefin elastomers may be cross-linked (vulcanized) or non-crosslinked. When crosslinked, various crosslinking strategies may be employed, with the chosen crosslinking strategy depending, at least in part, upon the structure of the polymer backbone.

One issue that is sometimes encountered with polyolefin elastomers and other polymers having a high loading of hydrocarbon monomers is resistance to oil and other oleaginous substances. The marginal oil resistance of polyolefin elastomers may limit their use in locales where contact with an oil or hydrocarbon occurs, such as in gaskets, o-rings and flexible tubing. Polyolefin elastomers may sometimes be blended with other polymers that are more oil resistant to address this issue. Effective blending of the two polymers may be problematic in some instances (e.g., due to excessive viscosity and/or physical incompatibility between the two polymer domains). In addition, the polymer blend may be deficient in elasticity compared to the polyolefin elastomer component alone.

It can sometimes be desirable to modify the structure of a known polymer, such as a polyolefin elastomer, to form a new polymer having different or added material properties, particularly in response to a specific application need. The lack of reactive functional groups in some polyolefin elastomers may make further modification of these polymers rather difficult. Instead, structural modification of polyolefin elastomers oftentimes may necessitate performing the initial polymerization reaction with a different set of olefinic monomers altogether in order to introduce a desired structural feature during polymerization. In other instances, some desirable monomers may be incompatible with the polymerization conditions needed for polymerizing certain olefinic monomers. Thus, it may take considerable time and effort to prepare and identify a modified polyolefin elastomer having suitability for use in an intended application.

SUMMARY

In some embodiments, the present disclosure provides graft copolymers comprising a first polymer chain and a second polymer chain. The first polymer chain comprises at least a first olefinic monomer comprising isobutylene and a second olefinic monomer bearing a benzylic carbon atom or an allylic carbon atom. The second polymer chain is bonded to the benzylic carbon atom or the allylic carbon atom of the first polymer chain. The second polymer chain comprises at least one monomer that is not present in the first polymer chain. In more specific embodiments, the second polymer chain may be formed by anionic polymerization.

In other embodiments, graft copolymers of the present disclosure comprise a first polymer chain and a second polymer chain. The first polymer chain comprises a polyolefin bearing an allylic carbon atom. The second polymer chain is bonded to the allylic carbon atom of the first polymer chain. The second polymer chain comprises at least one monomer that is not present in the first polymer chain. In more specific embodiments, the second polymer chain may be formed by anionic polymerization. The allylic carbon atom may be present within a side chain, in some embodiments.

In some embodiments, the present disclosure provides methods for forming graft copolymers. The methods comprise: providing a first polymer chain comprising at least a first olefinic monomer comprising isobutylene and a second olefinic monomer bearing a benzylic carbon atom or an allylic carbon atom; generating a carbanion upon the benzylic carbon atom or the allylic carbon atom; combining at least one anionically polymerizable monomer with the carbanion upon the first polymer chain; and growing a second polymer chain from the benzylic carbon atom or the allylic carbon atom of the first polymer chain via anionic polymerization.

In other embodiments, methods for forming graft copolymers comprise: providing a first polymer chain comprising a polyolefin bearing an allylic carbon atom; deprotonating the allylic carbon atom with an organometallic base to form a carbanion; combining at least one anionically polymerizable monomer with the carbanion upon the first polymer chain; and growing a second polymer chain from the allylic carbon atom of the first polymer chain via anionic polymerization. The allylic carbon atom may be present within a side chain, in some embodiments.

DETAILED DESCRIPTION

The present disclosure generally relates to polyolefin graft copolymers and, more specifically, to polyolefin elastomers having a second polymer chain bonded to a benzylic carbon atom or an allylic carbon atom thereof and methods for their production and use.

As discussed above, polyolefin elastomers may sometimes be used as a substitute for natural rubber and synthetic elastomeric polymers. However, polyolefin elastomers sometimes exhibit properties, such as limited resistance to oil and similar oleaginous substances, which may limit their use in certain applications, Polymer blending may sometimes be performed to address this difficulty, but the polymer blends sometimes may not exhibit specific properties needed for performing a particular application. Moreover, effective polymer blending may be difficult in certain circumstances. The properties of polyolefin elastomers and other polymers may also be adjusted by changing the polymer structure or functionalization. In the case of polyolefin elastomers, changing the polymer structure may necessitate performing the initial polymerization reaction with a different set of olefinic monomers in order to introduce a particular structural modification during polymerization. Such non-convergent polymer syntheses may result in a laborious and time-consuming effort to identify a suitable polyolefin elastomer for use in a particular application having need of specific polymer properties.

In contrast to the foregoing, the present disclosure provides a much more convergent approach for synthesizing modified polyolefins having particular structural types. The modified polyolefins may have elastomeric properties in some instances. Namely, the present disclosure provides polyolefins that are graft copolymers, which may be advantageously synthesized from an existing polymer chain (e.g., a parent polyolefin elastomer) to afford significant synthetic advantages with respect to convergence. More specifically, the present disclosure features parent polyolefin elastomers having a side chain with a benzylic carbon atom or an allylic carbon atom, which may serve as an attachment point for grafting (bonding) a second polymer chain thereto. The benzylic carbon atom or the allylic carbon atom may be deprotonated with various organometallic bases to afford a carbanion, which may then react with an anionically polymerizable monomer to graft the second polymer chain to the first polymer chain. In an alternative variant, a lithium-halogen exchange reaction may be used to form a benzylic carbanion that may similarly affect anionic polymerization of an anionically polymerizable monomer.

A wide variety of monomers are known to undergo anionic polymerization, some of which form polyolefins and others of which produce different classes of polymers. As such, the present disclosure provides ready access to a wide range of polymeric materials. Because a given parent polyolefin elastomer may serve as a common starting material for grafting a wide range of polymer chains thereto, the polymer syntheses disclosed herein afford considerable synthetic convergency. Moreover, at least some of the graft copolymers disclosed herein are not readily obtained through de novo polymerization, particularly when the second polymer chain has a different polymer backbone than the first polymer chain.

The graft copolymers of the present disclosure encompass a wide range of polymer structures. Therefore, considerable tailoring of the structures of both the parent polyolefin elastomer and the second polymer chain may be performed to facilitate identification of a graft copolymer having properties suitable for a specific type of application. Because different types of polymer backbones may be chemically bonded together with one another according to the present disclosure, the graft copolymers disclosed herein may lessen the need to blend poly olefin elastomers with other types of polymers in order to achieve a desired set of properties. Depending on the compatibility of the parent polyolefin elastomer and the second polymer chain, heterogeneous microstructural domains or homogeneous polymer chain blending may take place in the graft copolymers described herein, either of which may be advantageous for certain applications.

The polymer syntheses disclosed herein may be particularly advantageous for introducing functionality in the form of a second polymer chain to isobutylene elastomers containing a co-monomer bearing a benzylic carbon atom or an allylic carbon atom. Isobutylene elastomers possess chemical and oxidation inertness, low gas permeability and high hysteresis properties. Isobutylene elastomers, particularly those containing styrene co-monomers, may have good ozone and heat resistance as a result of their polymer backbone saturation. Noise and vibrational dampening may also be exhibited by certain isobutylene elastomers. Although the foregoing properties may be desirable during an intended application, the low chemical reactivity of isobutylene elastomers may make their further functionalization rather problematic isobutylene copolymers containing a sufficient amount of benzylic carbon atoms or allylic carbon atoms for affecting further functionalization may allow the desirable properties of the parent isobutylene elastomer to be maintained while still introducing additional functionality according to the disclosure herein. Such isobutylene graft copolymers may be advantageous for use in various applications, such as in the tread, sidewalk, and/or inner tubes of tires. Noise and vibrational dampening, sealing (e.g., gaskets), mattress components, shoe soles, and the like are additional applications where isobutylene graft copolymers of the present disclose may find applicability.

All numerical values within the detailed description and the claims herein are modified by "about" or "approximately" with respect to the indicated value, and take into account experimental error and variations that would be expected by a person having ordinary skill in the art, Unless otherwise indicated, room temperature is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A", and "B."

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides).

As used herein, Mn is number average molecular weight, Mw is weight average molecular weight, and Mz is z average molecular weight. Suitable measurement techniques for each type of molecular weight measurement will be familiar to one having ordinary skill in the art. Molecular weight distribution (MWD), also referred to as the polydispersity index (PDI), is defined to be Mw divided by Mn. Unless otherwise noted, all molecular weights are expressed in g/mol.

The term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "$C_n$" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic.

The terms "saturated" or "saturated hydrocarbon" refer to a hydrocarbon or hydrocarbyl group in which all carbon atoms are bonded to four other atoms or bonded to three other atoms with one unfilled valence position thereon.

The terms "unsaturated" or "unsaturated hydrocarbon" refer to a hydrocarbon or hydrocarbyl group in which one or more carbon atoms are bonded to less than four other atoms, optionally with one unfilled valence position on the one or more carbon atoms.

The terms "hydrocarbyl" and "hydrocarbyl group" are used interchangeably herein. The term "hydrocarbyl group" refers to any $C_1$-$C_{100}$ hydrocarbon group bearing at least one unfilled valence position when removed from a parent compound. "Hydrocarbyl groups" may be optionally substituted, in which the term "optionally substituted" refers to replacement of at least one hydrogen atom or at least one carbon atom with a heteroatom or heteroatom functional group. Heteroatoms may include, but are not limited to, B, O, N, S, P, F, Cl, Br, I, Si, Pb, Ge, Sn, As, Sb, Se, and Te. Heteroatom functional groups that may be present in substituted hydrocarbyl groups include, but are not limited to, functional groups such as O, S, S=O, S(=O)$_2$, NO$_2$, F, Cl, Br, I, NR$_2$, OR, SeR, TeR, PR$_2$, AsR$_2$, SbR$_2$, SR, BR$_2$, SiR$_3$, GeR$_3$, SnR$_3$, PbR$_3$, where R is a hydrocarbyl group or H. Suitable hydrocarbyl groups may include alkyl, alkenyl, alkynyl, aryl, aralkyl, heteroaryl, cycloalkyl, heterocyclyl, and the like, any of which may be optionally substituted.

The term "alkyl" refers to a hydrocarbyl group having no unsaturated carbon-carbon bonds, and which may be optionally substituted.

The term "alkenyl" refers to a hydrocarbyl group having a carbon-carbon double bond, and which may be optionally substituted. The terms "alkene" and "olefin" are used synonymously herein. Similarly, the terms "alkenic" and "olefinic" are used synonymously herein. Unless otherwise noted, all possible geometric isomers are encompassed by these terms. The term "diene" refers to an alkenyl group having two carbon-carbon double bonds.

The terms "aromatic" and "aromatic hydrocarbon" refer to a hydrocarbon or hydrocarbyl group having a cyclic arrangement of conjugated pi-electrons that satisfy the Mickel rule. The term "aryl" is equivalent to the term "aromatic" as defined herein. The term "aryl" refers to both aromatic compounds and heteroaromatic compounds, either of which may be optionally substituted. Both mononuclear and polynuclear aromatic and heteroaromatic compounds are encompassed by these terms.

Examples of saturated hydrocarbyl groups include, but are not limited to, methyl, ethyl, n-propyl, isopropyl, n-butyl, isobutyl, sec-butyl, tert-butyl, pentyl, isopentyl, hexyl, octyl, cyclopropyl, cyclobutyl, cyclopentyl, cyclohexyl, cyclooctyl, and the like, including their substituted analogues. Examples of unsaturated hydrocarbyl groups include, but are not limited to, ethenyl, propenyl, allyl, butadienyl, cyclopropenyl, cyclobutenyl, cyclopentenyl, cyclohexenyl, cyclooctenyl and the like, including their substituted analogues.

Examples of aromatic hydrocarbyl groups include, but are not limited to, phenyl, tolyl, xylyl, naphthyl, and the like, including all possible isomeric forms thereof. Heteroaryl and polynuclear heteroaryl groups may include, but are not limited to, pyridine, quinoline, isoquinoline, pyrimidine, quinazoline, acridine, pyrazine, quinoxaline, imidazole, benzimidazole, pyrazole, benzopyrazole, oxazole, benzoxazole, isoxazole, benzisoxazole, imidazoline, thiophene, benzothiophene, furan and benzofuran. Polynuclear aryl hydrocarbon groups may include, but are not limited to, naphthalene, anthracene, indane, indene, and tetralin.

The term "linear" refers to a hydrocarbon or hydrocarbyl group having a continuous carbon chain without side chain branching, in which the continuous carbon chain may be optionally substituted with heteroatoms or heteroatom groups.

The term "alpha olefin" refers to an alkenic hydrocarbon bearing a carbon-carbon double bond at a terminal (end) carbon atom of the main carbon chain.

The terms "branch" and "branched" refer to a hydrocarbon or hydrocarbyl group having a linear main carbon chain or cyclic carbon ring in which hydrocarbyl side chain extends from the linear main carbon chain or cyclic carbon ring. Optional heteroatom substitution may be present in the linear main carbon chain, the cyclic carbon ring, or in the hydrocarbyl side chain.

The term "homopolymer" refers to a polymer in which all monomers are the same. The term "copolymer" refers to a polymer in which two or more different monomers are present. The term "terpolymer" refers to a polymer in which three different monomers are present. The term "different" indicates that the monomers differ from one another by the presence or absence of at least one atom and/or isomerically.

The term "graft copolymer" refers to two compositionally distinct polymer chains that are covalently bonded together with one another at one or more locations.

The term "anionic polymerization" refers to a polymerization process in which initiation and propagation steps take place via a carbanion intermediate.

The term "carbanion" refers to a trivalent carbon atom bearing a formal negative charge as an open valence position.

The term "benzylic" refers to a sp$^3$ carbon atom directly bonded to an aromatic or heteroaromatic ring.

The term "allylic" refers to a sp$^3$ carbon atom directly bonded to an olefinic carbon atom.

The present disclosure describes graft copolymers containing a first polymer chain that is a polyolefin and a second polymer chain bonded (grafted) to the first polymer chain. The first polymer chain may be a homopolymer or copolymer comprising a plurality of olefinic monomers, in which a benzylic carbon atom or an allylic carbon atom is present, such as in at least one side chain of the first polymer. The second polymer chain is bonded to the first polymer chain through the benzylic carbon atom or the allylic carbon atom. Particular graft copolymers are discussed in more detail herein below.

The graft copolymers may feature a first polymer chain that is a random polyolefin copolymer. Alternately, the first polymer chain may be non-random, such as a block copolymer having a regular repeat cycle of the monomers therein. The second polymer chain may be a homopolymer or a random copolymer. Hence, any particular monomer ordering shown in the structural formulas of the present disclosure is intended to be illustrative and non-limiting. Moreover, the structural formulas herein have depicted a head-to-tail bonding between adjacent monomers, but it is to be appreciated that head-to-head bonding also falls within the scope of the present disclosure.

Formula 1 shows the structural formula of a graft copolymer containing a first polymer chain bonded to a second polymer chain through a benzylic carbon atom or an allylic carbon atom.

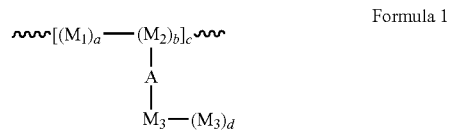

Formula 1 in which $M_1$ is a first olefinic monomer or mixture of olefinic monomers, $M_2$ is a second olefinic monomer or mixture of olefinic monomers, A is a hydrocarbyl side chain of $M_2$ bearing a benzylic carbon atom or an allylic carbon atom, and $M_3$ is an anionically polymerizable monomer or mixture of anionically polymerizable monomers. At least one second olefinic monomer $M_2$ is bonded to a second polymer chain comprising $M_3$ in the graft copolymers defined by Formula 1, but all second olefinic monomers $M_2$ need not necessarily be bonded to a second polymer chain. A terminal (first) $M_3$ is directly bonded to the benzylic carbon atom or the anylic carbon atom in hydrocarbyl side chain A, and a plurality of $M_3$ are bonded to the terminal $M_3$ as an anionically polymerized polymer chain. Side chains are encompassed within the structure(s) associated with $M_1$. At least a portion of the first olefinic monomers defined by $M_1$ may comprise any second olefinic monomers defined by $M_2$-A that have not been reacted with $M_3$. Variable c is an integer ranging from 0 to about 1,000, variable b is an integer ranging from 0 to about 100, variable c is an integer ranging from about 1,000 to about 1,000,000, and variable d is an integer ranging from about 100 to about 1,000,000.

In some embodiments, hydrocarbyl side chain A may be a benzylidene group or substituted benzylidene group that extends from the polyolefin polymer backbone. The benzyliclene group may be a 1,2-benzylidene group, a 1,3-benzylidene group, or a 1,4-benzylidene group. In certain instances, hydrocarbyl side chain A may be a 1,4-benzylidene group.

In other embodiments, hydrocarbyl side chain A may represent an allylic carbon atom, in which the carbon atom extends directly from the polyolefin polymer backbone as a side chain. The olefinic bond associated with the allylic carbon atom array reside within the polyolefin polymer backbone. Alternately, the entirety of the allyl group or substituted allyl group may reside within a side chain of the polyolefin polymer backbone (e.g., when butadiene is polymerized in a 1,4-manner).

Anionically polymerizable monomers that may be incorporated in the graft copolymers are not considered to be particularly limited. Suitable anionically polymerizable monomers may include, but are not limited to, styrene, α-methylstyrene, (o, m, or p)-methylstyrene, (o, m, or p)-chlorostyrene, (m or p)-divinylbenzene, (m or p)-diisopropenylbenzene, (m or p)-vinylisopropenylbenzene, vinylnaphthalene, acenaphthalene, butadiene, isoprene, 2,3-dimethylbutadiene, 1,3-pentadiene, 2-cyanobutadiene, 2-chlorobutadiene, 2-phenylbutadiene, vinyl chloride, vinylidene chloride, acrylonitrile, α-methacrylonitrile, α-ethacrylonitrile, α-octylacrylonitrile, N,N-dimethylacrylamide, N,N-diethylacrylamide, N,N-dioctylacrylamide, N-methyl-N-ethylacrylamide, N,N-dimethylmethacrylamide, N,N-diethylmethacrylamide, N,N-dioctylmethacrylamide, N-methyl-N-ethylmethacrylamide, N-methylacrylamide, N-ethylacrylamide, N-octylacrylamide, N-methylmethacrylamide, N-ethylmethacrylamide, N-octylmethacrylamide, methyl acrylate, ethyl acrylate, butyl acrylate, t-butyl acrylate, cyclohexyl acrylate, 2-methylhexyl acrylate, octyl acrylate, methyl methacrylate, methyl ethacrylate, ethyl methacrylate, t-butyl methacrylate, phenyl methacrylate, 2-vinylpyridine, 3-vinylpyridine, 4-vinylpyridine, 2-vinylimidazole, methyl vinyl ketone, ethyl vinyl ketone, t-butyl vinyl ketone, N-vinylcarbazole, trimethoxyvinylsilane, triethoxyvinylsilane, tri-2-methoxyethoxysilane, triacetoxyvinylsilane, trimethylvinylsilane, tributylvinylsilane, dimethyldivinylsilane, hexamethylcyclotrisiloxane, octamethylcyclotetrasiloxane, hexaphenylcyclotrisiloxane, octaphenylcyclotetrasiloxane, 2,4,6-trimethyl-2,4,6-triphenylcyclotrisiloxane, trimethyltriethylcyclotrisiloxane, tetramethyltetraethylcyclotrisiloxane, trimethyltrivinylcyclotrisiloxane, ethylisocyanate, propylisocyanate, n-butylisocyanate, isobutylisocyanate, amylisocyanate, hexylisocyanate, octadecylisocyanate, phenylisocyanate, benzylisocyanate, allylisocyanate, tolylisocyanate, p-methoxyphenylisocyanate, ethylene oxide, propylene oxide, 1,2-epoxybutadiene, 1,2-epoxyhexane, 1,2-epoxyoctane, 2-phenyl-1,2-epoxyethane, 4-phenyl-1,2-epoxybutane, the like, and any combination thereof.

The graft copolymers may optionally be further crosslinked (vulcanized). Suitable crosslinking strategies are discussed in more detail below. The molecular weights specified below represent pre-crosslinking values.

The first polymer chain in the graft copolymers may have Mn values ranging from about 20,000 to about 5,000,000, or about 40,000 to about 2,000,000, or about 50,000 to about 1,000,000. PDI values may range from 1.5 to about 3.0, or about 2.0 to about 3.5. These values represent those of the first polymer chain before the second polymer chain is grafted thereto.

The second polymer chain in the graft copolymers may have Mn values ranging from about 100 to about 30,000, or about 1,000 to about 100,000. PDI values may range from 1.0 to about 2.0, or about 1.1 to about 3.0.

Overall, the graft copolymers may have Mn values ranging from about 50,000 to about 1,000,000, or about 200,000 to about 2,000,000. PDI values may range from 1.5 to about 3.0, or about 2.2 to about 3.5.

Up to about 5% or up to about 10% of the olefinic monomers in the first polymer chain may feature bonding to a second polymer chain through the benzylic carbon atom or allylic carbon atom in A. In more specific embodiments, about 0.1% to about 2%, or about 0.2% to about 5%, or about 0.5% to about 10%, or about 0.5% to about 5%, or about 0.1% to about 2% of the olefinic monomers in the first polymer chain may be bonded to a second polymer chain.

Up to about 50% or up to about 90% of the second olefinic monomers in the first polymer chain bearing a benzylic carbon atom or an allylic carbon atom may be bonded to a second polymer chain. In more specific embodiments, about 1% to about 75% of the second olefinic monomers in the first polymer chain may be bonded to a second polymer chain, or about 5% to about 30%, or about 10% to about 70%. The second olefinic monomers that do not undergo bonding to a second polymer chain maintain their original position in the first carbon chain and retain their benzylic or allelic carbon atom in an unfunctionalized state.

The block copolymers described above may be synthesized by grafting (growing) a second polymer chain onto an existing polyolefin polymer backbone bearing a benzylic carbon atom or an allylic carbon atom within a side chain thereof. Namely, an organometallic base may be utilized to generate a carbanion at the benzylic carbon atom or allylic carbon atom of the first polymer chain, which may then react with an anionically polymerizable monomer to grow the second polymer chain from the benzylic carbon atom or the allylic carbon atom. The organometallic base may be an alkyl lithium compound, optionally containing an activator. Reaction of the organometallic base with the benzylic carbon atom or the allylic carbon atom to generate the carbanion may be complete (i.e., all of the benzylic or allylic carbon atoms become bonded to a second polymer chain) or partial (i.e., some of the benzylic or allylic carbon atoms are bonded to the second polymer chain and others are not).

In some embodiments, generation of the carbanion upon the benzylic carbon atom or the allylic carbon atom may occur through deprotonation. As one of ordinary skill in the art will appreciate, the enhanced acidity of benzylic and allylic hydrogen atoms relative to those upon other $sp^3$ carbon atoms may facilitate their deprotonation following exposure to an organometallic base. The general approach for synthesizing graft copolymers through a benzylic or allylic deprotonation is shown in Schemes 1 and 2 below, Scheme 1

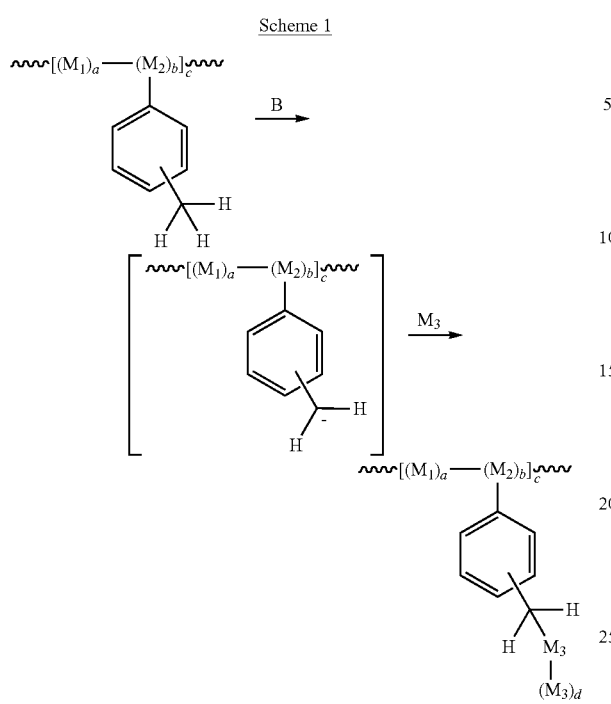

Scheme 2

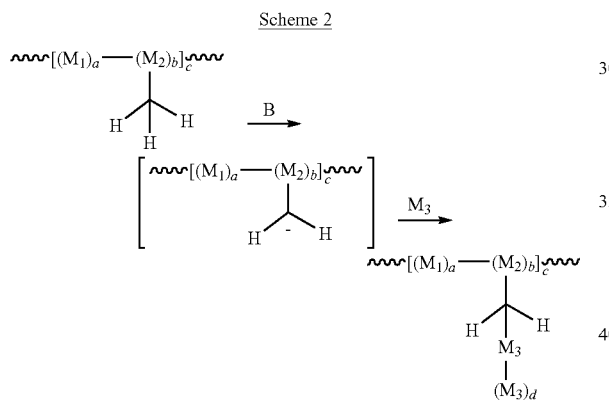

in which $M_1$, $M_2$, $M_3$ a, b, c and d are defined as above, and B is an organometallic base, particularly an alkyl lithium compound, optionally containing a further activator. In Scheme 2, the side chain methyl group is bound to an olefinic carbon atom in the polymer backbone (in which case $M_2$ is a diene monomer), thereby making the methyl group a primary allylic carbon atom. As referenced above, side chain allyl groups in which the entirety of the allyl group resides within the side chain also fall within the scope of the present disclosure. Moreover, although Schemes 1 and 2 have shown growth of the second polymer chain from each of the benzylic or allylic carbon atoms, it is to be recognized that some of the benzylic or allylic carbon atoms may remain unreacted, as discussed above.

Suitable organometallic bases for forming a carbanion upon a benzylic carbon atom or an allylic carbon atom via deprotonation may include alkyl lithium compounds. Suitable alkyl lithium compounds may include, but are not limited to, methyl lithium, ethyl lithium, propyl lithium, n-butyl lithium, s-butyl lithium, t-butyl lithium, or the like.

An activator may be present in combination with the alkyl lithium compound when deprotonating the benzylic carbon atom or allylic carbon atom. Suitable activators may include, but are not limited to, sterically hindered alkoxide and amine bases. Illustrative activators may include, for example, potassium t-butoxide, potassium neopentoxide, sodium t-butoxide, potassium t-pentoxide, sodium t-pentoxide, potassium isopentoxide, and N,N,N',N'-tetramethyethylenediamine.

An alternative approach for forming a carbanion upon a benzylic carbon atom is shown in Scheme 3 below, Scheme 3

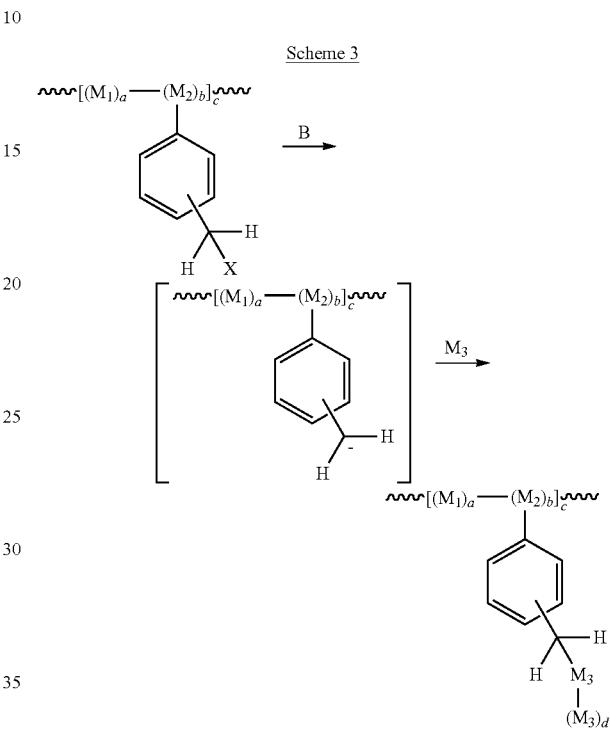

in which a lithium-halogen exchange reaction is used to generate the carbanion from a benzylic halide (X=Br or I). Once the carbanion forms in Scheme 3, it may then react in a similar manner to that described above in reference to Scheme 1 to bond the second polymer chain to the first polymer chain through the benzylic carbon atom.

Suitable alkyl lithium compounds for performing a lithium-halogen exchange reaction include the alkyl lithium compounds suitable for performing a deprotonation, including those listed above. Other alkyl lithium compounds may be suitable as well.

Accordingly, in a more specific structural depiction, graft copolymers described herein may be defined by Formula 2 below, Formula 2

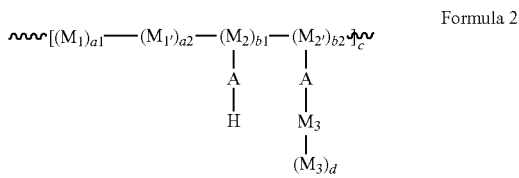

in which $M_1$ and $M_{1'}$ are first olefinic monomers that differ from one another, variables a1 and a2 are integers ranging from 0 to about 1,000, $M_2$ and $M_{2'}$ are second olefinic monomers that differ from one another in their side chain functionalization $M_{2'}$ is bonded to $M_3$ though A and $M_2$ is not), and variables b1 and b2 are integers ranging from 0 to about 100. $M_3$, A and variables c and d are defined as above. At least one second olefinic monomer $M_{2'}$ is bonded to a second polymer chain comprising $M_3$ in the graft copolymers defined by Formula 2, The molar ratio of $M_2$ to $M_{2'}$ may range from about 99:to about 1:1.

In more specific embodiments, graft copolymers of the present disclosure may comprise a first polymer chain comprising at least a first olefinic monomer comprising isobutylene and a second olefinic monomer bearing a benzylic carbon atom or an allylic carbon atom, and a second polymer chain bonded to the benzylic carbon atom or the allylic carbon atom of the first polymer chain, in which the second polymer chain comprises at least one monomer that is not present in the first polymer chain. According to more specific embodiments of the present disclosure, the second polymer chain may be formed by anionic polymerization, as discussed above.

Graft copolymers of the present disclosure having an isobutylene monomer and an olefinic monomer bearing a benzylic carbon atom or an allylic carbon atom may have a structure defined by Formula 3 below,

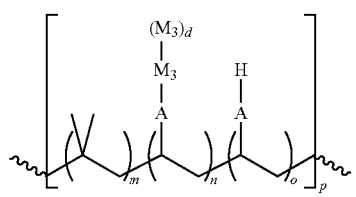

Formula 3 in which A, $M_3$ and variable d are defined as above, variable m is an integer ranging between 0 and about 1,000, variables n and o are integers ranging between 0 and about 100, and variable p is an integer ranging from about 1,000 to about 1,000,000. At least one second polymer chain comprising $M_3$ is bonded to the benzylic carbon atom or allylic carbon atom of the first polymer chain in the graft copolymers of the present disclosure, but all benzylic or allylic carbon atoms need not necessarily be bonded to a second polymer chain, as shown in Formula 3 above.

In more specific embodiments, graft copolymers of the present disclosure having a first olefinic monomer comprising isobutylene and a second olefinic monomer bearing a benzylic carbon atom or an allylic carbon atom may have structures defined by Formulas 4 or 5 below,

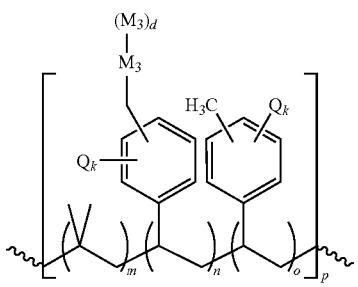

Formula 4

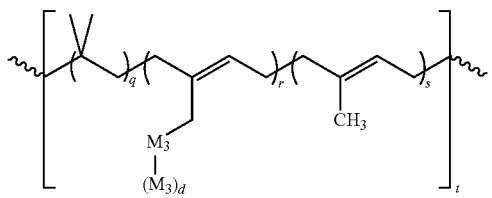

Formula 5 in which $Q_k$ represents optional aromatic ring functionality that is unreactive with alkyl lithium compounds and may be selected from any combination of hydrocarbyl, fluoro, perfluoroalkyl, alkoxy, aryloxy, perfluoroalkoxy, perfluoroaryloxy, and the like, wherein variable k has a maximum value of the number of open valence positions upon the aromatic ring. When variable k=0, no further aromatic ring substitution is present, and the open valence positions are occupied by H. Variables m and q are integers ranging from 0 to about 1.000. Variables n, o, r and s are integers ranging from 0 to about 100. Variables p and t are integers ranging from about 1,000 to about 1,000,000. At least one olefinic monomer bearing a benzylic carbon atom or an allylic carbon atom is bonded to a second polymer chain comprising $M_3$ in the graft copolymers defined by Formulas 4 and 5.

The structure defined by Formula 5 is a copolymer of isobutylene and isoprene, in which the isoprene monomers are depicted as being polymerized in a 1,4 manner. It is to be further appreciated that the isoprene monomers in Formula 5 may be incorporated in the block copolymers of the present disclosure in a different regioisomeric configuration than that depicted. Accordingly, Formula 6 shows an alternative regioisomeric configuration for the isoprene monomer units that also resides within the scope of the present disclosure.

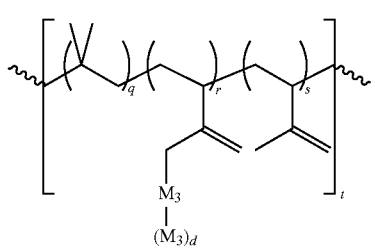

Formula 6

In Formula 6, the isoprene monomers are polymerized in a 1,2 manner. Any combination of isoprene regioisomers may be present in the copolymers defined by Formulas 5 and 6. Thus, the depiction of a single isoprene regioisomer in Formulas 5 and 6 should not be considered limiting. It is also to be further appreciated that the geometric configuration of the olefinic bond in Formula 5 may be cis or trans, and the depicted geometric isomer is not limiting of the scope of the present disclosure.

As can be further appreciated from Formulas 5 and 6, the allylic carbon atom that becomes bonded to the second polymer chain comprising $M_3$ may be present in an allyl group that is partially defined within the polymer backbone (Formula 5) or fully located within a side chain (Formula 6).

According to more particular embodiments of the present disclosure, the first polymer chain may comprise a copolymer of isobutylene and p-methylstyrene or a copolymer of isobutylene and isoprene.

Graft copolymers defined by Formulas 4-6 may comprise a second polymer chain that is formed by anionic polymerization, particularly with any of the exemplary anionically polymerizable monomers discussed above. In more specific embodiments, the second polymer chain may comprise a polyolefin or a polyethylene oxide. Thus, in particular examples, monomer $M_3$ may be an alkyl olefin e.g., propene, 1-butene, 1-hexene, or the like), butadiene, isoprene, a styrene, acrylonitrile, an alkyl or aryl acrylate (e.g., methyl acrylate or phenyl acrylate), an alkyl or aryl methacrylate methyl methacrylate or phenyl methacrylate), acrylamide, methacrylamide, an N-alkylacrylamide, an N-arylacrylamide, an N-alkylmethacrylamide, an N-arylmethacrylamide, an N-alkyl-N-arylacrylamide, an N-alkyl-N-arylmethacrylamide, an N,N-dialkylacrylamide, an N,N-diarylacrylamide, an N,N-dialkylmethacrylmide, an N,N-diarylmethacrylamide, ethylene oxide, propylene oxide, a $C_{4+}$ alkylene oxide (e.g., 1,2-epoxyhexane), or $C_{8+}$ arylene oxide (e.g., styrene oxide). The second polymer chain may comprise a single anionically polymerizable monomer or any combination of the foregoing anionically polymerizable monomers.

Methods for forming graft copolymers having a first polymer chain including an isobutylene monomer may comprise: providing a first polymer chain comprising at least a first olefinic monomer comprising isobutylene and a second olefinic monomer bearing a benzylic carbon atom or an allylic carbon atom, generating a carbanion upon the benzylic carbon atom or the allylic carbon atom, combining at least one anionically polymerizable monomer with the carbanion upon the first polymer chain, and growing a second polymer chain from the benzylic carbon atom or the allylic carbon atom of the first polymer chain via anionic polymerization. According to more specific embodiments, the second polymer chain may comprise at least one monomer that is not present in the first polymer chain.

Further embodiments of the graft polymerization methods may comprise terminating growth of the second polymer chain by adding a suitable terminating agent. Terminating growth of the second polymer chain may be performed, for example, once a desired chain length of the second polymer chain and/or molecular weight of the graft copolymer as a whole has been reached. Suitable terminating agents may include protic agents such as water and alcohols, for example.

Generating a carbanion upon a benzylic carbon atom or an allylic carbon atom of the graft copolymers may be accomplished through deprotonation using an organometallic base. Suitable organometallic bases may include the exemplary alkyl lithium compounds discussed above, optionally combined with an activator, such as a hindered base (e.g., potassium t-butoxide, N,N,N',N'-tetramethylethylenediamine, or similar compounds discussed above). Alternately, a carbanion may be generated from a benzylic bromide or a benzylic iodide through a lithium-halogen exchange reaction, also using an alkyl lithium compound. Similar types of alkyl lithium compounds may be used to generate a carbanion by either route.

Suitable deprotonation conditions may include reaction temperatures below room temperature, particularly in a range from about $-100°$ C. to about $0°$ C., or about $-78°$ C. to about $-10°$ C. Suitable solvents may include, for example, hydrocarbon solvents or ether solvents (e.g., diethyl ether or tetrahydrofuran). Similar conditions and solvents may be utilized for performing a lithium-halogen exchange reaction.

Lithium-halogen exchange reactions may be performed upon second olefinic monomers bearing a benzylic bromide or a benzylic iodide in order to form the graft copolymers described herein. Formula 7 shows the structure of an illustrative copolymer containing a monomer bearing a benzylic halide suitable for undergoing lithium-halogen exchange according to the disclosure herein,

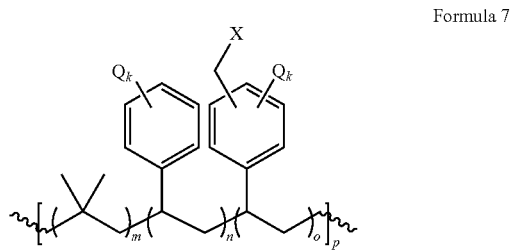

Formula 7 in which X is bromide or iodide, $Q_k$ is defined above, and variables m, n, o and p are defined as above. In more specific embodiments, $Q_k$ is not present, and the open valence positions in the aromatic rings are occupied by H. The benzylic bromide or iodide may be located in the para-position of the aromatic ring in still more embodiments.

Graft copolymers of the present disclosure may also feature a first polymer chain lacking an isobutylene monomer and bearing an allylic carbon atom within a side chain of the polymer backbone. Thus, according to some embodiments, graft copolymers of the present disclosure may comprise a first polymer chain comprising a polyolefin bearing an allylic carbon atom within a side chain, and a second polymer chain bonded to the allylic carbon atom of the first polymer chain, in which the second polymer chain comprises at least one monomer that is not present in the first polymer chain. In more specific embodiments, such grail copolymers may be formed by anionic polymerization. According to more specific embodiments, the second polymer chain may comprise at least one monomer that is not present in the first polymer chain.

In more specific embodiments of such graft copolymers, the first polymer chain may comprise at least a first olefinic monomer that is a diene. Other than butadiene, diene polymerization to form a polyolefin affords placement of an allylic carbon atom within a side chain of the first polymer chain. Butadiene may be co-polymerized with other diene monomers to provide a first polymer chain having both side chain and main chain allylic carbon atoms. Accordingly, suitable dienes that may be included as the first olefinic monomer in the first polymer chain of the graft copolymers disclosed herein include, for example, butadiene, isoprene, dicyclopentadiene, 5-ethylidene-2-norbornene, 5-vinylidene-2-norbornene, or any combination thereof. The allylic carbon atom extending from the diene monomer may form a carbanion according to the disclosure herein, as discussed further above.

In more specific embodiments, the first polymer chain may comprise a copolymer of the first olefinic monomer, particularly a dime monomer, and at least one additional olefinic monomer.

In some or other more specific embodiments, the first polymer chain may comprise a polybutadiene (i.e., a homopolymer or copolymer containing butadiene as a monomer) or a polyisoprene (i.e., a homopolymer or copolymer containing isoprene as a monomer). In other more specific embodiments, the first polymer chain may comprise a terpolymer of ethylene, propylene, and a diene monomer (EPDM). Suitable diene monomers for inclusion in an EPDM first polymer chain may include those listed above, and in particular embodiments may comprise dicyclopentadiene, 5-ethylidene-2-norbornene, or 5-vinylidene-2-norbornene. Formula 8 shows a particular example of an ethylidene-2-norbornene diene monomer functionalized with a second polymer chain according to the disclosure herein,

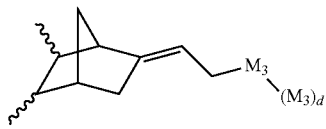

Formula 8 in which $M_3$ and variable d are defined as above. Either geometric isomer of the double bond may be present. The wavy bonds extending from the norbornene ring are attached to other monomer units, specifically ethylene, propylene, or functionalized or unfunctionalized diene monomers.

In accordance with the disclosure above, the second polymer chain may be formed by anionic polymerization, with growth of the second polymer chain occurring from the allylic carbon atom of the polyolefin following carbanion formation. Monomers and combinations thereof that may undergo anionic polymerization to form the second polymer chain may include those listed above. In more particular embodiments, the second polymer chain may comprise a polyolefin or a polyethylene oxide.

Accordingly, the present disclosure also provides methods for forming graft copolymers via activation of an allylic carbon atom. The methods may comprise: providing a first polymer chain comprising a polyolefin bearing an allylic carbon atom within a side chain, deprotonating the allylic carbon atom with an organometallic base to form a carbanion, combining at least one anionically polymerizable monomer with the carbanion upon the first polymer chain, and growing a second polymer chain from the allylic carbon atom of the first polymer chain via anionic polymerization.

Further embodiments of the graft polymerization methods may comprise terminating growth of the second polymer chain by adding a suitable terminating agent.

Terminating growth of the second polymer chain may be performed, for example, once a desired chain length of the second polymer chain and/or molecular weight of the graft copolymer as a whole has been reached. Suitable terminating agents may include protic agents such as water and alcohols, for example.

Monomers and combinations thereof that may undergo anionic polymerization from the allylic carbon atom include those listed above. In more particular embodiments, the second polymer chain may comprise a polyolefin or a polyethylene oxide.

Generating a carbanion upon the allylic carbon atom of the graft copolymers may be accomplished through deprotonation using an organometallic base. Suitable organometallic bases may include the exemplary alkyl lithium compounds discussed above, optionally combined with an activator, such as a hindered base (e.g., potassium t-butoxide or N,N,N',N'-tetramethylethylenediamine).

Suitable deprotonation conditions may include reaction temperatures below room temperature, particularly in a range from about −100° C. to about 0° C., or about −78° C. to about −10° C. Suitable solvents may include, for example, hydrocarbon solvents or ether solvents (e.g., diethyl ether or tetrahydrofuran).

The graft copolymers disclosed herein may be thermoplastic elastomers in some embodiments. In thermoplastic elastomers of the present disclosure, there is no additional covalent crosslinking between the polymer chains other than the covalent bonding between the first polymer chain and the second polymer chain through the benzylic carbon atom or the allylic carbon atom. Instead, the crosslinking between the first and second polymer chains through the benzylic carbon atom or the allylic carbon atom provides a sufficiently stable network structure to promote elastomeric behavior.

In other embodiments, the graft copolymers of the present disclosure may be thermoset elastomers. Such thermoset elastomers may be additionally crosslinked with a suitable crosslinking agent. The additional crosslinking is further to the crosslinking between the first polymer chain and the second polymer chain through the benzylic carbon atom or the allylic carbon atom.

Polyolefins having an unsubstituted allylic carbon atom polyisoprene and related polymers) may be crosslinked using crosslinking agents such as, for example, sulfur plus an organic accelerator (e.g., thiurams or thiocarbonates), phenolic resins (e.g., phenol-formaldehyde resins), bisazidoformates, quinones (e.g., quinone dioxime), and the like. Polyolefins having an allylic carbon atom that is halogen-substituted (e.g., halobutyl rubber and related polymers) may be crosslinked using crosslinking agents such as, for example, zinc oxide, bismaleimides, diamines, peroxides, thioureas, dithiols and disulfides, optionally employing accelerators such as thiazoles, thiocarbamates, alkoxythiocarbonyl compounds, dialkylthiophosphoryl compounds, and diamino-2,4,6-triazines. Various additives may be present when crosslinking halobutyl rubber and related polymers, such as epoxidized soybean oil, butylated hydroxytoluene, zinc stearate, zinc octanote, and/or calcium stearate. Polyolefins having a benzylic halide, particularly a benzylic bromide, may be crosslinked using crosslinking agents such as, for example, zinc stearate, zinc bromide, diamines, phenolic resins, thiosulfates, and Friedel-Crafts alkylation catalysts. Suitable crosslinking conditions and the crosslinked polyolefin structures that are produced using a particular crosslinking agent will be familiar to one having ordinary skill in the art.

In addition, the various graft copolymers formed according to the present disclosure may also be blended with further additives to form compositions that can then be used in articles of manufacture or for an intended application. Suitable additives may include antioxidants, nucleating agents, acid scavengers, plasticizers, stabilizers, anticorrosion agents, blowing agents, gases, solvents, foaming agents, ultraviolet light absorbers, quenchers, antistatic agents, slip agents, phosphites, phenolics, pigments, dyes, fillers, cure agents, and any combination thereof.

Having described graft copolymers of the present disclosure hereinabove, the present disclosure further provides various compositions comprising the graft copolymers. Additional disclosure directed to the compositions and uses thereof is provided hereinafter. Any of the graft copolymers described hereinabove may be incorporated in the various compositions of the present disclosure.

In some embodiments, the present disclosure provides foamed polymer compositions. The foamed polymer compositions comprise a gas component, and a graft copolymer having the features described hereinabove. The gas component is disposed in a plurality of voids within the graft copolymer. Any of the graft copolymers described hereinabove may be incorporated in the foamed polyolefin compositions disclosed herein.

Suitable uses for the foamed polymer compositions may include, but not limited to, seals and sealing applications, gaskets, and soundproofing foams.

Gas components suitable for use in the foamed polymer compositions may include any gas capable of introducing voids in a matrix of the graft copolymer. Suitable gas components may include, for example, air, oxygen, nitrogen, carbon dioxide, noble gases, or the like. The voids introduced into the graft copolymer may be closed cell or open cell, depending on the void density and the method employed for introducing the voids. In at least one embodiment, the graft copolymer may be foamed by placing the graft copolymer and the gas component under pressure and then rapidly depressurizing. The rapid depressurization may introduce voids comprising the gas component within the graft copolymer. According to various embodiments, the porosity (void space) within a matrix defined by the graft copolymer may range from about 50% to about 95%, or about 60% to about 90%, or about 70% to about 85%.

In some or other embodiments, the foamed polymer compositions disclosed herein may further comprise a surfactant, which may aid in the foaming process. Suitable surfactants may include various surface active agents, which may be cationic, anionic, amphoteric, or neutral.

In some embodiments, the foamed polymer compositions of the present disclosure may further comprise a foaming agent. Suitable foaming agents may include, but are not limited to, azobisformamide, azobisisobutyronitrile (AIBN), diazoaminobenzene, N,N-dimethyl-N,N-dinitrosoterephthalamide, N,N-dinitrosopentamethylenetetramine, benzenesulfonyl hydrazide, benzene-1,3-disulfonyl hydrazide, 4,4'-oxybisbenzene sulfonyl hydrazide, p-toluenesulfonyl semicarbazide, barium azodicarboxylate, butylamine nitrile, nitroureas, trihydrazino triazine, peroxides, and inorganic blowing agents such as ammonium bicarbonate and sodium bicarbonate.

In some embodiments, the foamed polymer compositions may be foamed neat without a solvent being present. In other embodiments, the foamed polymer compositions may be foamed when dissolved in a solution, such as in a hydrocarbon solvent.

This invention also relates to:
1. A graft copolymer comprising: a first polymer chain comprising at least a first olefinic monomer comprising isobutylene and a second olefinic monomer bearing a benzylic carbon atom or an allylic carbon atom; and a second polymer chain bonded to the benzylic carbon atom or the allylic carbon atom of the first polymer chain, the second polymer chain comprising at least one monomer that is not present in the first polymer chain.
2. The graft copolymer of paragraph 1, wherein the second polymer chain is formed by anionic polymerization.
3. The graft copolymer of paragraph 1 or paragraph 2, wherein the second polymer chain comprises a polyolefin or a polyethylene oxide.
4. The graft copolymer of any one of paragraphs 1-3, wherein the first polymer chain comprises a copolymer of isobutylene and p-methylstyrene.
5. The graft copolymer of any one of paragraphs 1-3, wherein the first polymer chain comprises a copolymer of isobutylene and isoprene.
6. A method for forming a graft copolymer, comprising:
   providing a first polymer chain comprising at least a first olefinic monomer comprising isobutylene and a second olefinic monomer bearing a benzylic carbon atom or an allylic carbon atom;
   generating a carbanion upon the benzylic carbon atom or the allylic carbon atom;
   combining at least one anionically polymerizable monomer with the carbanion upon the first polymer chain; and
   growing a second polymer chain from the benzylic carbon atom or the allylic carbon atom of the first polymer chain via anionic polymerization.
7. The method of paragraph 6, wherein generating the carbanion comprises deprotonating the benzylic carbon atom or the allylic carbon atom with an organometallic base.
8. The method of paragraph 7, wherein the organometallic base comprises an alkyl lithium compound combined with potassium t-butoxide.
9. The method of any one of paragraphs 6-8, wherein the first polymer chain comprises a copolymer of isobutylene and p-methylstyrene.
10. The method of any one of paragraphs 6-8, wherein the first polymer chain comprises a copolymer of isobutylene and isoprene.
11. The method of paragraph 6, wherein the second olefinic monomer comprises a benzylic bromide or a benzylic iodide, and generating the carbanion comprises performing a lithium-halogen exchange reaction, the lithium-halogen exchange reaction being performed by exposing the first polymer chain to an alkyl lithium compound.
12. The method of any one of paragraphs 6-11, wherein the second polymer chain comprises a polyolefin or a polyethylene oxide.
13. The method of any one of paragraphs 6-12, wherein the second polymer chain comprises at least one monomer that is not present in the first polymer chain.
14. A graft copolymer comprising:
   a first polymer chain comprising a polyolefin bearing an allylic carbon atom; and
   a second polymer chain bonded to the allylic carbon atom of the first polymer chain, the second polymer chain comprising at least one monomer that is not present in the first polymer chain.
15. The graft copolymer of paragraph 14, wherein the second polymer chain is formed by anionic polymerization.
16. The graft copolymer of paragraph 14 or paragraph 15, wherein the second polymer chain comprises a polyolefin or a polyethylene oxide.
17. The graft copolymer of any one of paragraphs 14-16, wherein the first polymer chain comprises a polyisoprene or a terpolymer of ethylene, propylene and a diene monomer.
18. The graft copolymer of paragraph 17, wherein the diene monomer is selected from the group consisting of dicyclopentadiene, 5-ethylidene-2-norbornene, and 5-vinylidene-2-norbornene.
19. The graft copolymer of any one of paragraphs 14-18, wherein the allylic carbon atom is present within a side chain.
20. A method for forming a graft copolymer, comprising:
   providing a first polymer chain comprising a polyolefin bearing an allylic carbon atom;
   deprotonating the allylic carbon atom with an organometallic base to form a carbanion;

combining at least one anionically polymerizable monomer with the carbanion upon the first polymer chain; and growing a second polymer chain from the allylic carbon atom of the first polymer chain via anionic polymerization.

21. The method of paragraph 20, wherein the second polymer chain comprises a polyolefin or a polyethylene oxide.

22. The method of paragraph 20 or paragraph 21, wherein the first polymer chain comprises a polyisoprene or a terpolymer of ethylene, propylene and a diene monomer.

23. The method of paragraph 22, wherein the diene monomer is selected from the group consisting of dicyclopentadiene, 5-ethylidene-2-norbornene, and 5-vinylidene-2-norbornene.

24. The method of any one of paragraphs 20-23, wherein the organometallic base comprises an alkyl lithium compound combined with potassium t-butoxide.

25. The method of any one of paragraphs 20-24, wherein the second polymer chain comprises at least one monomer that is not present in the first polymer chain.

26. The method of any one of paragraphs 20-25, wherein the allylic carbon atom is present within a side chain.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A method for forming a graft copolymer, comprising:
providing a first polymer chain comprising at least a first olefinic monomer comprising isobutylene and a second olefinic monomer bearing a benzylic carbon atom or an allylic carbon atom;

generating a carbanion upon the benzylic carbon atom or the allylic carbon atom;

combining at least one anionically polymerizable monomer with the carbanion upon the first polymer chain; and growing a second polymer chain from the benzylic carbon atom or the allylic carbon atom of the first polymer chain via anionic polymerization, wherein the first polymer chain comprises a copolymer of isobutylene and p-methylstyrene.

2. The method of claim 1, wherein generating the carbanion comprises deprotonating the benzylic carbon atom or the allylic carbon atom with an organometallic base.

3. The method of claim 2, wherein the organometallic base comprises an alkyl lithium compound combined with potassium t-butoxide.

4. The method of claim 1, wherein the second polymer chain comprises a polyolefin or a polyethylene oxide.

5. The method of claim 1, wherein the second polymer chain comprises at least one monomer that is not present in the first polymer chain.

6. A method for forming a graft copolymer, comprising:
providing a first polymer chain comprising at least a first olefinic monomer comprising isobutylene and a second olefinic monomer bearing a benzylic carbon atom or an allylic carbon atom;

generating a carbanion upon the benzylic carbon atom or the allylic carbon atom;

combining at least one anionically polymerizable monomer with the carbanion upon the first polymer chain; and growing a second polymer chain from the benzylic carbon atom or the allylic carbon atom of the first polymer chain via anionic polymerization, wherein the second olefinic monomer comprises a benzylic bromide or a benzylic iodide, and generating the carbanion comprises performing a lithium-halogen exchange reaction, the lithium-halogen exchange reaction being performed by exposing the first polymer chain to an alkyl lithium compound.

7. The method of claim 6, wherein the first polymer chain comprises a copolymer of isobutylene and isoprene.

8. The method of claim 6, wherein the second polymer chain comprises a polyolefin or a polyethylene oxide.

9. The method of claim 6, wherein the second polymer chain comprises at least one monomer that is not present in the first polymer chain.

\* \* \* \* \*